US 6,708,393 B1

(12) United States Patent
Roy et al.

(10) Patent No.: US 6,708,393 B1
(45) Date of Patent: Mar. 23, 2004

(54) VEHICLE FENDER AND DOOR ALIGNMENT FIXTURE

(75) Inventors: Michael Roy, Brampton (CA); Anthony J Osborne, Brampton (CA); John LeBlanc, Brampton (CA); Ronald R Moore, Limehouse (CA); Larry Weatherall, Honeywood (CA); Lawrence J Guc, Sterling Heights, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/283,923

(22) Filed: Oct. 30, 2002

(51) Int. Cl.$^7$ ............................................ B25B 27/14
(52) U.S. Cl. ................... 29/714; 29/281.1; 29/281.6; 29/281.4; 29/407.09; 29/407.1; 29/464; 29/468; 29/559; 29/DIG. 44; 269/21; 33/600; 33/613; 33/645
(58) Field of Search .................... 29/281.1, 281.4, 29/281.6, DIG. 44, 407.09, 407.1, 464, 468, 559, 709, 719, 784, 799, 829, 283; 269/21; 33/600, 613, 645

(56) References Cited

U.S. PATENT DOCUMENTS

| | | | | |
|---|---|---|---|---|
| 4,616,411 A | * | 10/1986 | Suzuki et al. | |
| 4,625,416 A | * | 12/1986 | Ohtaki et al. | |
| 5,040,290 A | * | 8/1991 | Usui et al. | |
| 5,079,832 A | * | 1/1992 | Ozawa et al. | |
| 5,123,148 A | * | 6/1992 | Ikeda et al. | |
| 5,406,697 A | * | 4/1995 | Busisi | |
| 6,463,644 B1 | * | 10/2002 | Pasque | |

* cited by examiner

Primary Examiner—David P. Bryant
Assistant Examiner—Eric B. Compton
(74) Attorney, Agent, or Firm—Donald J. Wallace

(57) ABSTRACT

A fixture and method for aligning a vehicle fender and door, particularly a fixture for an assembly line point that attaches to a vehicle door and moves a front edge of the door to a spacing element, attaches to a vehicle fender, moves the fender to the spacing element and to a pre-defined 3-dimensional relationship with the door, and holds the fender in the pre-defined relationship while the fender is secured in place on the vehicle.

10 Claims, 4 Drawing Sheets

VEHICLE FENDER AND DOOR ALIGNMENT FIXTURE

FIELD OF THE INVENTION

The present invention relates generally to methods and implements for aligning components on a vehicle during a vehicle manufacturing process. In another of its aspects, the invention relates to aligning a vehicle door and fender on a vehicle during manufacture.

BACKGROUND OF THE INVENTION

In the manufacture of automobiles on an assembly line, the automobile moves through a number of assembly points. Each of the assembly points, or stations, generally adds or adjusts components on the automobile. A mechanism at such an assembly point that manipulates components on and onto the automobile is generally known as a fixture.

Each fixture generally has a specialized task to perform. Various fixtures require varying levels of interaction with a human operator, from complete manual operation to complete automation.

One known fixture application is the alignment of front fenders on a body of the automobile relative to the front edge of each of the front automobile doors. This installation requires the proper orientation of the vehicle fender in each of three dimensions, relative to the respective door. The fender is generally formed with a rear edge to match the front edge of the door, so that a properly aligned fender and door will define a uniform gap therebetween. Proper vertical alignment aids in ensuring the uniformity of the gap. Proper horizontal alignment (front-to-rear of the automobile) results in an aesthetically pleasing seam that presents minimal discontinuity to the wind stream generated along the side of the automobile during forward movement of the vehicle at operating speed. Likewise, proper lateral alignment (into or away from the side of the car) will prevent the generation of unnecessary drag and wind noise during operation.

Apparatus and methods for aligning the fender and door are known, but require tedious and time-consuming manual adjustment by the fixture operator. The consumption of time and effort slows down the assembly line, increasing the cost of production. Furthermore such methods may still not result in the uniform product desired.

It would be advantageous to have a fixture and method whereby a door and fender can be aligned while on the assembly line, in a known and uniform, repeatable manner, with minimal input on the part of a human operator.

SUMMARY OF THE INVENTION

In one of its aspects, the invention includes a fixture for use on an automobile assembly line for removably attaching to an automobile fender and an adjacent door, and for aligning the fender to the door to create a uniform spacing therebetween. The fixture comprises: a door attachment portion for securing the fixture to the door, comprising at least one vacuum-actuated suction device; a fender attachment portion for securing the fixture to the fender, comprising at least one vacuum-actuated suction device; a spacing device for establishing a spacing between the door and the fender; and a transverse adjustment mechanism for moving the door attachment portion relative to the fender attachment portion.

In a further embodiment, the invention further comprises a lifting mechanism for positioning and holding the fender at a predefined height relative to the door.

In a further embodiment, the invention further comprises the transverse adjustment mechanism being adapted to move the door attachment portion relative to the fixture.

In a further embodiment, the invention further comprises a second transverse adjustment mechanism for moving the fender attachment mechanism relative to the fixture.

In a further embodiment, the invention further comprises a manual release for deactivating the vacuum-actuated suction devices of the door and fender attachment mechanisms.

In a further embodiment, the invention further comprises a probe for insertion into a corresponding aperture in the door, the probe being fixedly attached to the fixture.

In a further embodiment, the invention further comprises a switch for detecting a proximity of the fixture to one of the fender and door and activating a respective vacuum-actuated suction device.

In a further embodiment, the invention further comprises the spacing device comprising a blade for insertion between the door and fender.

In a further embodiment, the invention comprises a method of assembling a fender to a vehicle, comprising the steps of: aligning an assembly fixture with a door mounted on the vehicle; securing the fixture to the door; adjusting the position of the door relative to a known orientation on the fixture; aligning the fender at a known height relative to the fixture; securing the fixture to the fender; adjusting the position of the fender relative to a known orientation on the fixture; fixing the position of the fender relative to the door; and releasing the fixture from the door and fender.

In a further embodiment, the invention comprises a manually operated fixture within an automobile assembly line for removably attaching to an automobile fender and an adjoining door and aligning the fender to the door while maintaining a uniform gap or spacing therebetween. The fixture comprises: a door attachment mechanism for securing the fixture to the door, comprising a plurality of vacuum-actuated suction devices; a fender attachment mechanism for securing the fixture to the fender, comprising a plurality of vacuum-actuated suction devices; a probe for insertion into a corresponding aperture in the door, the probe being fixedly attached to the fixture; a spacing blade for defining a gap between the door and the fender, the blade being fixedly attached to the fixture; a lifting mechanism for positioning and holding the fender at a predefined height; a transverse adjustment mechanism for moving the door attachment mechanism relative to the fixture; a transverse adjustment mechanism for moving the fender attachment mechanism relative to the fixture; a switch for detecting a proximity of the fixture to one of the fender and door and activating a respective vacuum-actuated suction device; and a manual release for deactivating each of the vacuum-actuated suction devices of the door and fender attachment mechanisms.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
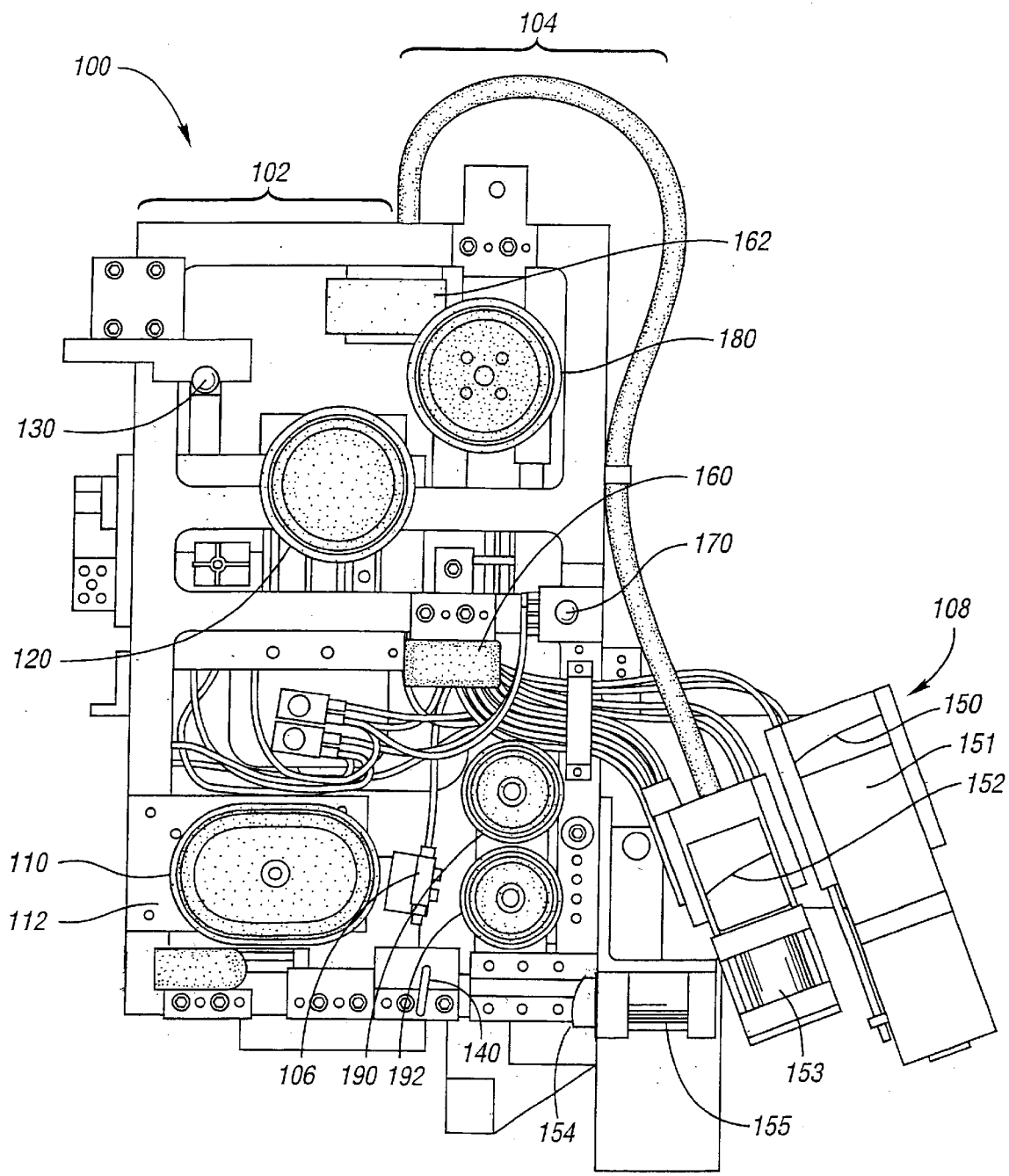
FIG. 1 is a front view of a vehicle-engaging face of a fender and door alignment fixture according to the invention.
Figure 2:
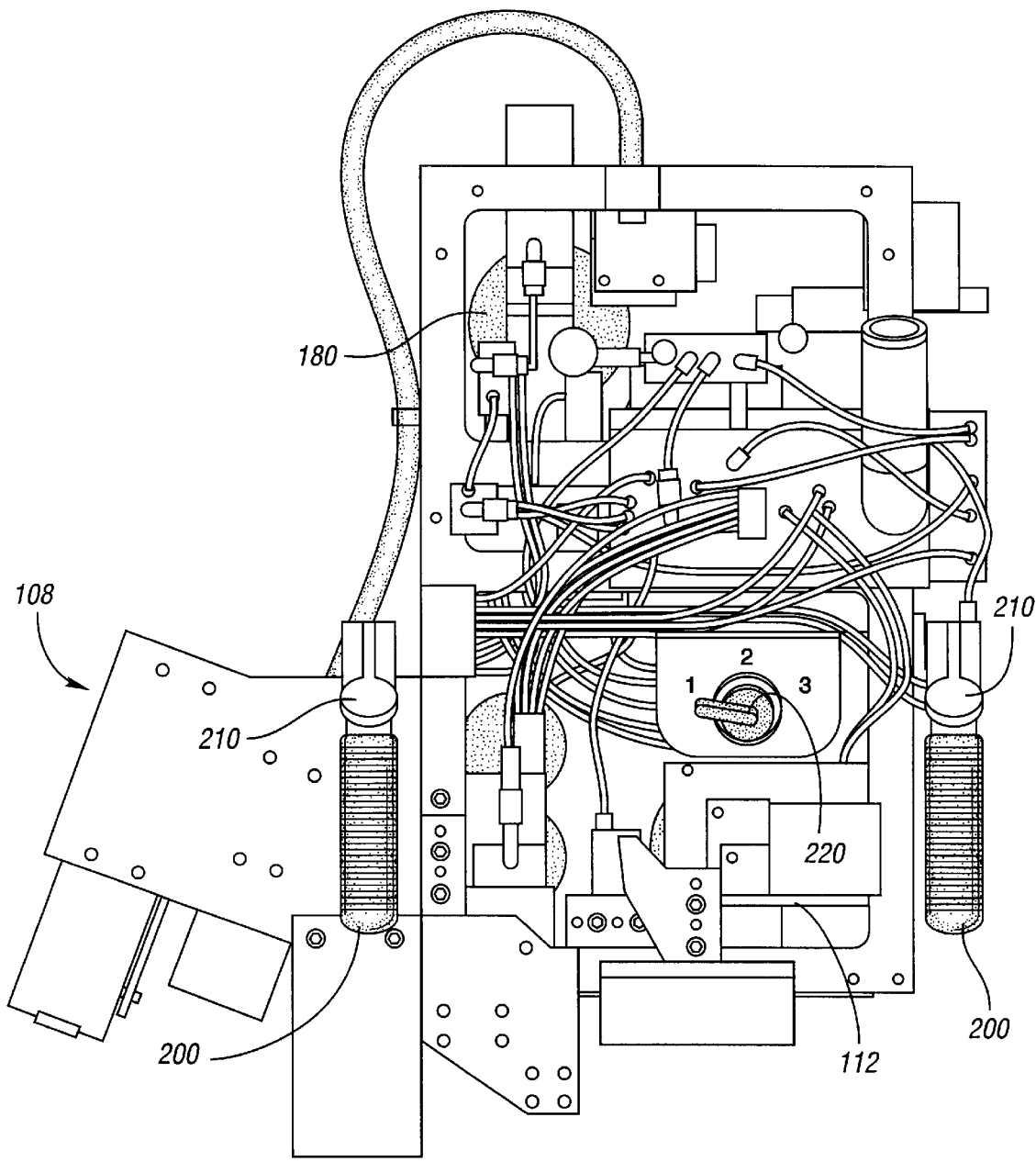
FIG. 2 is a front view of a control face of the fender and door alignment fixture of FIG. 1.

Referring to FIGS. 1–2, a fender and door alignment fixture 100 according to the invention includes a door attachment portion 102, a fender attachment portion 104, a proximity actuation switch 106, operator controls including disengagement paddles 210, and an alignment portion comprising a spacing blade 140 and an aperture probe 130. The door attachment portion 102 and the fender attachment portion 104 are movably mounted on the fixture 100, while the spacing blade 140 and aperture probe 130 are fixedly mounted on the fixture 100.

The door attachment portion 102 comprises a primary oval bellows suction cup 110 and a secondary suction cup 120. The oval bellows suction cup 1 10 is attached to a sliding mechanism 112 so that the oval bellows suction cup 110 can slide relative to the fixture 100 and, particularly, relative to the spacing blade 140 and aperture probe 130. The sliding action is in a transverse direction to the active side, or face of the suction cup 110, and is in a direction towards or away from the spacing blade 140. The sliding action is also in a plane parallel to the face plane of the fixture 100 directed toward the assembly line and vehicle.

The fender attachment portion 104 comprises a plurality of suction cups 180, 190, 192. The fender attachment portion 104 is slidably mounted to fixture 100 so that it can also slide relative to the fixture 100 and, particularly, relative to the spacing blade 140 and aperture probe 130. The sliding action is in a transverse direction to the active side, or face of the suction cups 180, 190, 192, and is in a direction towards or away from the spacing blade 140. The sliding action is also in a plane parallel to the face plane of the fixture 100 directed toward the assembly line and vehicle.

The suction cups 180, 190, 192 are further mounted to the fender attachment portion 104 on piston shaft mechanisms so that the suction cups 180, 190, 192 are moveable in a direction perpendicular to the fixture 100 and vehicle 10, toward and away from the assembly line.

The spacing blade 140 has a thickness for determining the width of the gap between the fender and door, and is fixedly mounted to the fixture 100 at a prescribed position, both in height and attitude (angle) with respect to the horizontal. The spacing blade 140, at the prescribed height and attitude, corresponds to a front edge of a vehicle door 20 as the vehicle 10 proceeds along the assembly line and comes to a stop in front of the fixture 100.

Figure 3:
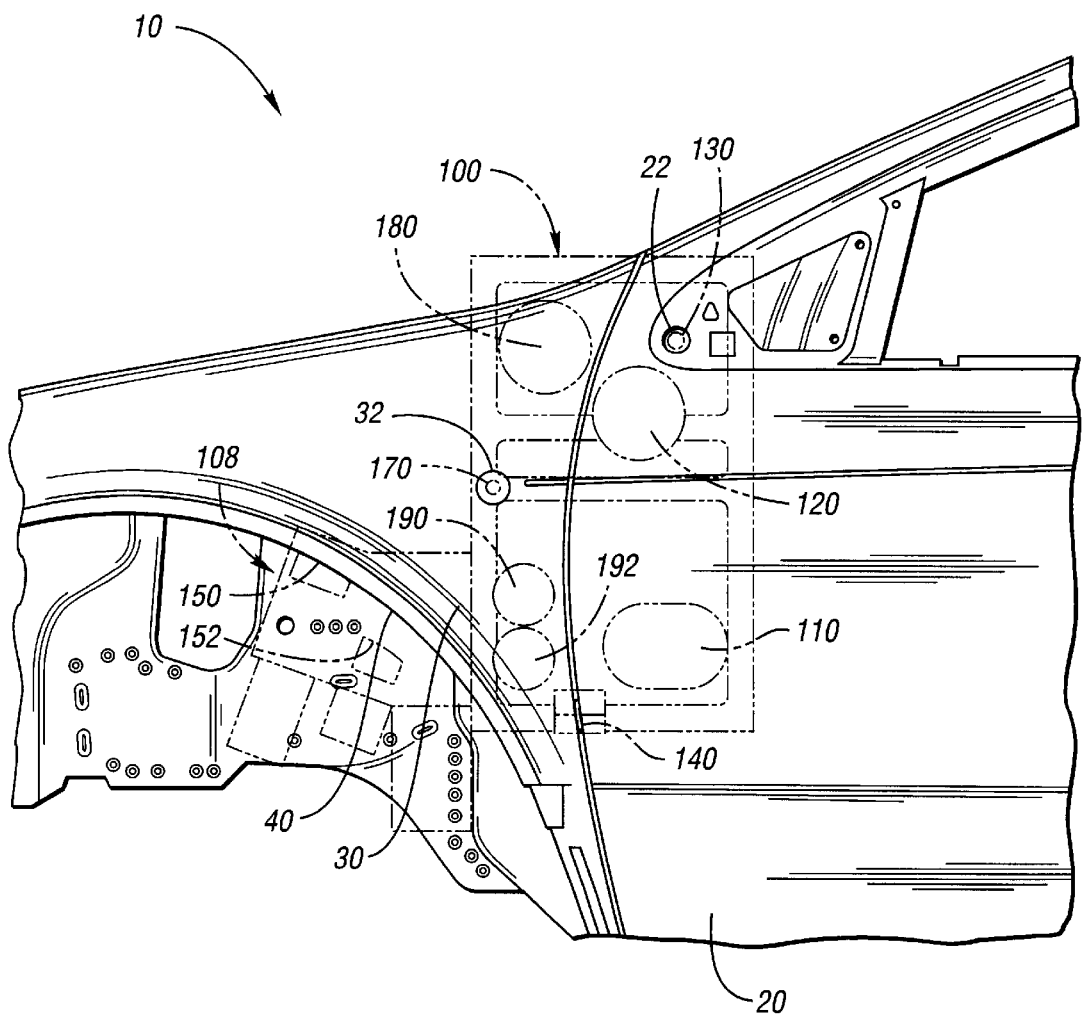
FIG. 3 is a side view of a sample vehicle door and fender with the fender and door alignment fixture of FIGS. 1–2 shown in phantom in an engaged position.

In like fashion, the aperture probe 130 is fixedly mounted to the fixture 100 at a prescribed position. The aperture probe 130 is adapted, when properly aligned, to correspond to an aperture 22 on the vehicle door 20, as shown in FIG. 3.

The fixture 100 further comprises a second aperture probe 170 for determining the presence of an aperture 32 on fender 30 of vehicle 10. The second aperture probe 170 is a switch/button that extends from the fixture 100. This second aperture probe 170 is used to confirm that the vehicle 10 in front of the fixture 100 corresponds to a vehicle model selected by the operator of the fixture 100.

Figure 4:
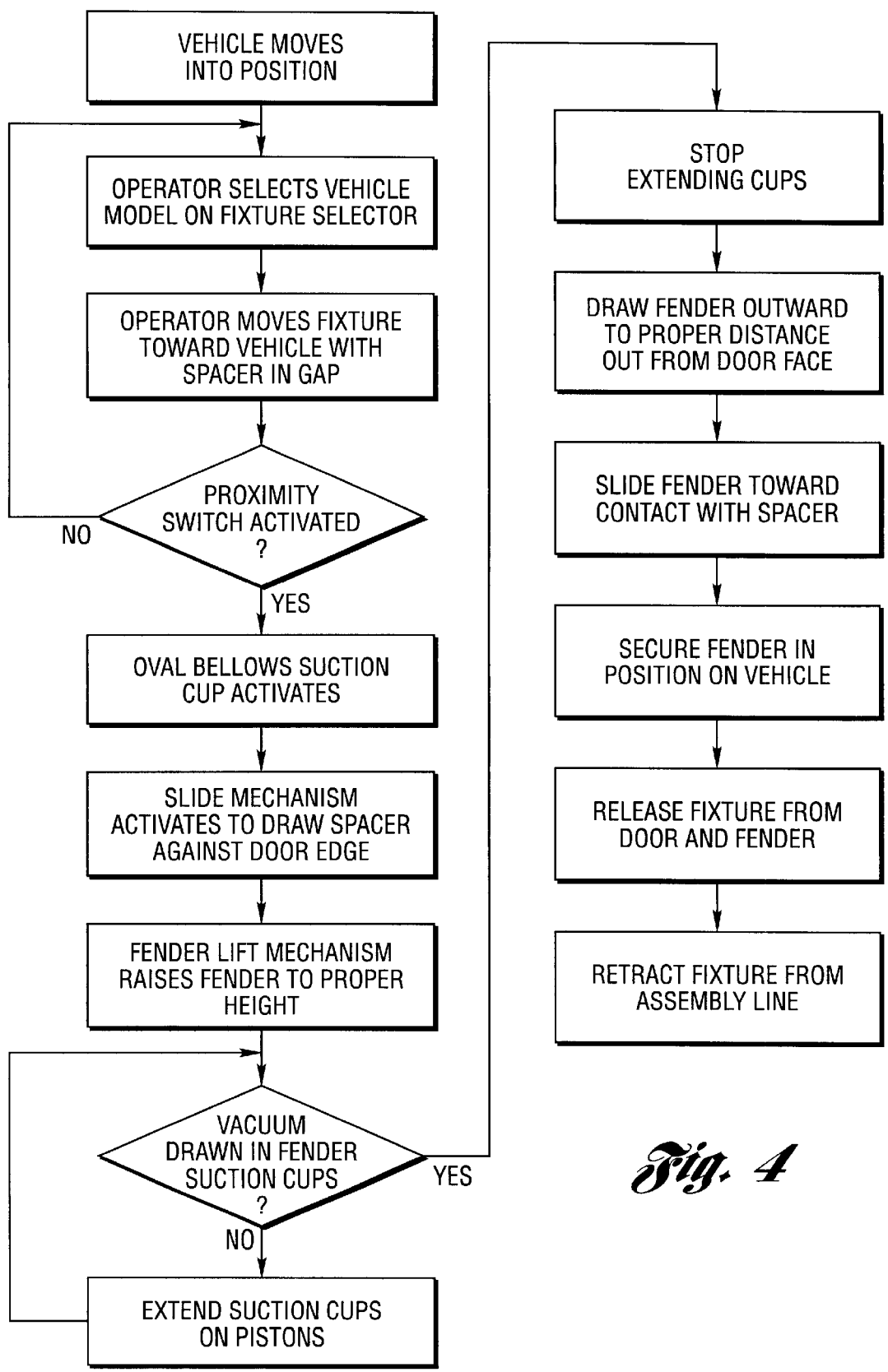
FIG. 4 is a flow-chart depicting an operational sequence of the fender and door alignment fixture of FIGS. 1–3.

The fixture 100 is adapted to function on multiple vehicle configurations or models; some vehicles will have an aperture 32 on fender 30 to align with the second probe 170 (e.g. a hole for a side marker light), and others will not. When a particular model of vehicle 10 comes before the fixture 100, the operator of the fixture 100 will set a selector lever 220 on the fixture 100 for that particular model vehicle 10. The fixture 100 is programmed to recognize, first, if the vehicle 10 is the type selected on the selector lever 220, by the location or existence of, for instance, the aperture 32 for the side marker light on the fender 30, which exists on some models and not on others. If the aperture 32 for the side marker light is absent when the selected vehicle 10 should have it, the fixture 100 will stop to allow correction by the operator. Once the fixture 100 confirms that the selected vehicle model is before it, it then commences a sequence specific to that vehicle model. An example of a sequence for a vehicle 10 follows and is depicted in the flow chart of FIG. 4.

A vehicle 10 is moved into position on the assembly line opposite the fixture 100. The fixture operator selects the vehicle type on selector 220 and grasps operator handgrips 200 to move fixture 100 toward vehicle 10. The fixture operator directs fixture 100 so that aperture probe 130 aligns in door aperture 22 and spacing blade 140 aligns in front of the forward edge of door 20. With probe 130 aligned with aperture 22 and spacing blade 140 generally aligned with the forward edge of door 20, the operator moves fixture 100 toward door 20 until proximity switch 106 contacts door 20 and activates the oval suction bellows 110. The oval suction bellows 110 attaches to door 20.

The oval suction bellows is slidably mounted on fixture 100 and is moveable by a pneumatic piston arrangement. After attachment to door 20, the bellows 110 is moved by the piston arrangement to draw the door 20 toward the spacing blade 140 until the front edge of the door 20 is positioned firmly and uniformly against spacing blade 140.

The fender attachment portion 104 of the fixture 100, meanwhile, is in position to begin engaging the fender 30. Lift mechanism 108 is in position in the wheel well portion 40 of fender 30. The model of vehicle 10 will determine which of blocks 150, 152 will engage wheel well portion 40. Lift mechanism 108 includes pneumatic pistons 151, 153 adapted to raise blocks 150, 152, respectively, against the wheel well portion 40, thereby positioning the fender 30 at the correct height to align with door 20. Suction cups 180, 190, 192 are movably mounted on the fixture on pistons so that they can extend from the fixture 100 until they contact the surface of fender 30. A suction is activated within the suction cups 180, 190, 192 so that when the suction cups contact the surface of fender 30, a vacuum is drawn to attach the suction cups 180, 190, 192 to the fender 30. The fender 30 is then drawn toward fixture 100 until it contacts bumpers 160, 162. Bumpers 160, 162 extend from fixture 100 a distance such that when fender 30 is drawn outwardly against bumpers 160, 162, the face of fender 30 is in the proper planar relationship with the face of door 20 relative to a centerline of the vehicle 10. The fender 30 is thus positioned slightly outwardly from the face of the door 20 so as to minimize the effects of drag and turbulence as the vehicle 10 travels down the road and air passes over fender 30 and door 20 and the seam or gap therebetween.

After the fender 30 is properly positioned vertically by lift mechanism 108 and outwardly against bumpers 160, 162, a sliding block 154 is extended by a piston 155 against a rearward edge of wheel well portion 40 to push the fender 30 against the spacing blade 140. With the fender 30 correctly oriented vertically and against spacing blade 140, fender 30 and door 20 define a pre-defined, generally uniform gap therebetween.

The fixture 100 holds the fender 30 and door 20 in this aligned position while the fixture operator attaches the fender 30 to the vehicle body. With the fender 30 secured to the vehicle body, the fixture 100 can be released from the fender 30 and door 20.

The fixture operator releases the fixture 100 from the fender 30 and door 20 by simultaneously activating the release paddles 210 while grasping the hand grips 200. Activating the release paddles 210 releases the suction within all suction cups 110, 120, 180, 190 and 192, and retracts the pistons on lift mechanisms 150, 152 and sliding block 154. Release of these elements enables the operator to retract the fixture 100 from the vehicle 10 and the assembly line. By requiring simultaneous activation of the paddles 210, the operator's hands are safely out of the mechanism of the fixture 100.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fixture for use on an automobile assembly line for removably attaching to an automobile fender and an adjacent door and aligning the fender to the door to create a uniform spacing therebetween, the fixture comprising:

a door attachment portion for securing the fixture to the door, comprising at least one vacuum-actuated suction device;

a fender attachment portion for securing the fixture to the fender, comprising at least one vacuum-actuated suction device;

a spacing device for establishing a spacing between the door and the fender; and a transverse adjustment mechanism for moving the door attachment portion relative to the fender attachment portion.

2. The fixture of claim 1, further comprising a lifting mechanism for positioning and holding the fender at a predefined height relative to the door.

3. The fixture of claim 1, wherein the transverse adjustment mechanism is adapted to move the door attachment portion relative to the fixture.

4. The fixture of claim 3, further comprising a second transverse adjustment mechanism for moving the fender attachment mechanism relative to the fixture.

5. The fixture of claim 1, further comprising a second transverse adjustment mechanism for moving the fender attachment portion relative to the fixture.

6. The fixture of claim 1, further comprising a manual release for deactivating the vacuum-actuated suction devices of the door and fender attachment mechanisms.

7. The fixture according to claim 1, further comprising a probe for insertion into a corresponding aperture in the door, the probe being fixedly attached to the fixture.

8. The fixture according to claim 1, further comprising a switch for detecting a proximity of the fixture to one of the fender and door and activating a respective vacuum-actuated suction device.

9. The fixture according to claim 1, wherein the spacing device comprises a blade for insertion between the door and fender.

10. A manually operated fixture within an automobile assembly line for removably attaching to an automobile fender and an adjoining door and aligning the fender to the door while maintaining a uniform gap or spacing therebetween, the fixture comprising:

a door attachment mechanism for securing the fixture to the door, comprising a plurality of vacuum-actuated suction devices;

a fender attachment mechanism for securing the fixture to the fender, comprising a plurality of vacuum-actuated suction devices;

a probe for insertion into a corresponding aperture in the door, the probe being fixedly attached to the fixture;

a spacing blade for defining a gap between the door and the fender, the blade being fixedly attached to the fixture;

a lifting mechanism for positioning and holding the fender at a predefined height;

a transverse adjustment mechanism for moving the door attachment mechanism relative to the fixture;

a transverse adjustment mechanism for moving the fender attachment mechanism relative to the fixture;

a switch for detecting a proximity of the fixture to one of the fender and door and activating a respective vacuum-actuated suction device; and a manual release for deactivating each of the vacuum-actuated suction devices of the door and fender attachment mechanisms.

* * * * *